Figure 1:
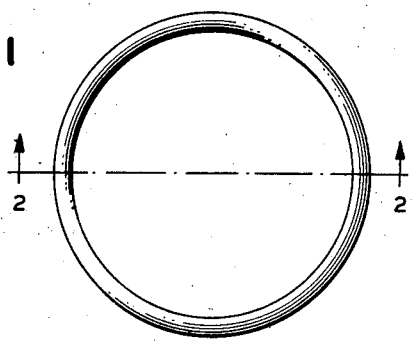

United States Patent Office 2,767,768
Patented Oct. 23, 1956

2,767,768
INSULATING COMPOSITIONS AND METHOD OF FORMING SAME

Ulrich Jelinek, Springfield, N. J., assignor to The M. W. Kellogg Company, Jersey City, N. J., a corporation of Delaware Application August 1, 1952, Serial No. 302,058

18 Claims. (Cl. 154—33.1)

This invention relates to insulating compositions and the method of preparing them. In one aspect, the invention relates to insulating compositions in the form of gaskets covered with a polymer of trifluorochloroethylene. More particularly in this aspect, the invention relates to resilient solid insulating compositions in the form of gaskets covered with a solid polymer of trifluorochloroethylene.

The manufacture of insulating compositions, in the form of gaskets, possessing elasticity or shape-retaining properties is not new. Gaskets having such properties are particularly useful in turbines, motors, generators, or other forms of machines requiring gaskets or nose-seals which can effectively function at high speeds and under high pressures, while undergoing distortion and even some abrasion under such conditions. Various materials possessing such elastic or resilient properties have been heretofore employed in the manufacture of shape-retaining gaskets or seals. Such materials include rubber (both natural and synthetic), various thermoplastic compositions, and various reinforced and impregnated plastics. It has been found, however, that in many industrial applications, gaskets made of such materials are not chemically resistant when exposed to various powerful oxidizing agents, in the course of performing their mechanical functions, such as fuming nitric acid, sulfuric acid, hydrofluoric acid, motor fuels used as rocket propellants, and various reagents such as aqua regia, hydrochloric acid, other strong acids and strong caustic solutions. Exposure of gaskets, manufactured from such materials, results in their rapid deterioration, impaired efficiency and relatively short useful life. It is, therefore, desirable to provide an improved gasket composed of materials which not only possess the aforementioned structural elasticity and shape-retaining properties, but which also are chemically resistant to attack or deterioration by any of the aforementioned oxidizing agents, motor fuels or reagents.

It is an object of this invention to provide an improved insulating composition in the form of a gasket.

Another object of this invention is to provide an improved insulating composition in the form of a gasket having structural elasticity and shape-retaining properties, but also resistant to chemical attack or deterioration.

Still another object of the invention is to provide a method for preparing an improved insulating composition in the form of a gasket.

Various other objects and advantages of the present invention will become apparent to those skilled in the art from the accompanying description and disclosure.

In accordance with this invention, I have discovered that insulating compositions in the form of gaskets, comprising a resilient solid polymer of tetrafluoroethylene as a core, and covered with a relatively thin contiguous sheath comprising a polymer of trifluorochloroethylene, are more chemical and abrasion resistant while, at the same time, possessing a substantially similar overall modulus of elasticity as gaskets comprised of other materials, such as natural or synthetic rubber, silicone resins, or other thermoplastic materials, but without the additional covering of the aforementioned polymer of trifluorochloroethylene. These gaskets covered with a sheath of polymeric trifluorochloroethylene, in addition to possessing the aforementioned chemical and abrasion-resistant advantages, exhibit substantially no indications of diminished desirable physical properties and are just as resilient as gaskets comprised of polymeric tetrafluoroethylene, not covered with a sheath comprising a polymer of trifluorochloroethylene.

The core of the improved insulating composition or gasket of the present invention comprises a solid polymer of tetrafluoroethylene, which has structural elasticity and shape-retaining properties, and an overall lower modulus of elasticity than polymeric trifluorochloroethylene alone. In addition, in accordance with the process of the invention, this core may comprise a solid polymer of tetrafluoroethylene and inorganic filler materials which do not in themselves possess the required structural elasticity or shape-retaining properties of the tetrafluoroethylene, but which impart strength or resilience to the tetrafluoroethylene core. Such filler materials may, therefore, comprise asbestos; powdered minerals, e. g., talc, mica, soap-stone, trap-rock or oyster shell; and various clays, e. g., diatomaceous earths. When the latter materials are incorporated with tetrafluoroethylene for making the core of the improved gasket of the present invention, or when tetrafluoroethylene itself is employed as the core without the presence of the latter additional filler materials, it is necessary to prefabricate this core by suitable molding operations, which will be more fully hereinafter described.

As indicated above, the core of the improved gasket of the present invention is covered with a relatively thin contiguous sheath comprising a polymer of trifluorochloroethylene. The preparation of the monomer, trifluorochloroethylene, from which the desired solid polymer is obtained, is accomplished by dechlorinating Freon 113 (1, 1-2 trifluorochloroethylene), under suitable conditions of dehalogenation in the presence of a solvent, such as methyl alcohol and a metallic dehalogenating agent, such as zinc dust, to produce an effluent comprising the monomer trifluorochloroethylene, including unreacted trifluorochloroethylene and solvent. This effluent is next passed to a suitable fractional distillation system in which substantially pure trifluorochloroethylene is recovered as a relatively low-boiling fraction.

The monomer thus obtained is polymerized under suitable polymerization conditions, with or without the presence of a suitable catalyst or promoter. Such conditions may include the use of a suitable catalyst comprising an organic peroxide, such as trifluorodichloropropionyl peroxide or bis-trichloroacetyl peroxide preferably dissolved in a suitable solvent, such as trichlorofluoromethane, at a temperature between about —20° C. and about 25° C., and preferably at a temperature of about —16° C. At a temperature of about —16° C. the polymerization of trifluorochloroethylene to the solid polymer is accomplished in about 7 days and in a suitable yield. At elevated temperatures, less time is required to complete the polymerization. After the desired extent of polymerization has taken place, the resulting polymerization reaction mixture is removed from the polymerization zone and the polymeric product is recovered from the solvent or the catalyst or polymerizing agent.

Polymers of trifluorochloroethylene possess certain desirable physical and chemical characteristics, with four-fifths of the weight being supplied by the halogens, fluorine and chlorine. These polymers are colorless, transparent, and have been found to possess a high chemical stability, with no effect being observed on the polymer after prolonged exposure to concentrated sulfuric, hydrofluoric and hydrochloric acids, strong caustic, fuming nitric acid, aqua regia, and other vigorous oxidizing materials. The polymer is hard but not brittle and is flowable at temperatures above about 500° F. In addition, the polymer is flexible and resilient, but is not wetted by water or affected by high humidity. The molding of these polymers requires a certain degree of care, inasmuch as they tend to change their physical characteristics to varying degrees under the influence of the molding conditions.

Polymers of trifluorochloroethylene of varying molecular weight are produced by the method indicated above, by suitable control of conditions in polymerization. In molding the solid polymer, in accordance with the present invention, for the purpose of forming a covering or relatively thin contiguous sheath over the aforementioned core material, the molding temperature is carefully selected by reference, directly or indirectly, to the molecular weight of the polymer to be molded. Temperatures in the range between about 415° F. and about 625° F. are satisfactory, but best results are obtained by selecting a molding temperature within this range which is the optimum temperature for the particular molecular weight of the polymer being molded.

It is impractical to ascertain the molecular weight for each polymer to be molded under normal circumstances. Accordingly, a simple test has been devised which provides a direct indication of the proper mold temperature. This test comprises measurements of the temperature at which no tensile strength is exhibited under the conditions of the test. The test is applied to standard or test pieces of the plastic material. This temperature is referred to as the "no strength temperature" or "no strength temperature value," and is abbreviated N. S. T. Accordingly, the N. S. T. value serves as a useful guide in the molding of plastics, and has particular applicability to plastics comprising essentially polytrifluorochloroethylene. The measurement of the N. S. T. value is carried out in suitable apparatus on a strip of the plastic measuring 2" by 1/8" by 1 1/16". Conveniently, such strips may be notched or grooved in a straight line across one large surface at the center, transversely to the longitudinal axis. The notch, or groove, is made perfectly straight and extended to a depth of 1/64". The strength test is then applied to the point of minimum cross-section. The sample is suspended vertically, with a small weight (approximately 4" long), suspended from the lower end of the test strip on a fine wire. The above-mentioned weight is so adjusted that the total weight from the notch down is 0.5 gram. The test piece is suspended in a suitable chamber whose internal temperature is brought up to 410° F. The temperature is then raised at a rate of 2.7° F. per minute until the sample pulls apart at the notch. The N. S. T. value is the temperature at which the test strip is pulled in two. This determination is not highly sensitive to small variations in test strip thickness (±0.003"), however, care must be taken to cut a sharp, clean notch of uniform depth. Differences of 10° F. are normally considered significant.

As previously indicated, the solid polymer of trifluorochloroethylene is molded at a temperature in the range between about 415° F. and about 625° F., for the purpose of forming a continuous covering or relatively thin contiguous sheath over the aforementioned core material. The particular molding temperature is selected by reference to the molecular weight of the polymer to be molded. Accordingly, the optimum operating conditions are determined by the particular N. S. T. value of the polytrifluorochloroethylene plastic treated. In this respect, it has been found that the N. S. T. value of the polytrifluorochloroethylene plastic may vary from about 220° C. to about 350° C. and that the polymers falling within this range of N. S. T. values may be satisfactorily treated under the above range of operating temperature conditions. In general, it has been found that as the N. S. T. value increases, the die temperature should also be increased (with the pressure remaining constant) to insure the best results. In a given instance, the pressure employed is that which is required to mold the material in a sufficiently short time at the temperature selected. It is found that the pressure required in molding at a temperature within the aforementioned range will fall within the range between about 700 and about 1,400 pounds per square inch, although in certain instances pressures as low as 500 or as high as 25,000 pounds per square inch may also be employed. Thus, maintaining compacting pressure on the die between about 700 and 1,400 pounds per square inch in each instance, it has been found that a polytrifluorochloroethylene plastic having an N. S. T. value of 240° C. can be satisfactorily pressed at temperatures between about 445° F. and about 500° F., while a polymer having an N. S. T. value of 270° C. is satisfactorily pressed at temperatures between about 465° F. and about 535° F. Polymers having an N. S. T. value of 300° C. are satisfactorily pressed at temperatures between about 480° F. and about 590° F. The polytrifluorochloroethylene plastic having a relatively low N. S. T. value, such as 240° C., flows easier at the molding temperature and produces a relatively harder finished article, while polymers having a relatively high N. S. T. value, such as 300° C., are more viscous at the molding temperature but produce a more flexible finished article.

The particular pressing time required for completely converting the stock and forming the finished article (that is the desired gasket consisting of a solid core comprising tetrafluoroethylene covered with a contiguous sheath of the solid polymer of trifluorochloroethylene) under the selected operating conditions of temperature and pressure and based upon the respective N. S. T. value, is determined by the thickness of the polytrifluorochloroethylene covering or sheath which is to be formed. In general, the thickness of the polytrifluorochloroethylene sheath to be obtained should be within the range between about .001" and about .030", with a thickness of about .015" (±.003") being generally preferred.

As the N. S. T. value of the polytrifluorochloroethylene plastic increases, the molding or pressing time for a given thickness is also increased. It should be noted that as the pressing temperature is raised, the pressing time will decrease. Thus, for example, a polytrifluorochloroethylene plastic having an N. S. T. value of 300° C. can be pressed in one-half the time at 570° C., which approaches the upper limit of the preferred die temperature range of 480° F.–590° F., for a plastic having the aforementioned N. S. T. value of 300° C. In general, the pressing time for forming a covering or sheath of the polytrifluorochloroethylene plastic involves a matter of seconds to approximately two or three minutes.

In the description of the operating conditions for carrying out the above molding procedure in forming a relatively thin contiguous covering or sheath of the polytrifluorochloroethylene plastic to be encased around the tetrafluoroethylene core of the desired gasket, the stock to be treated is a plastic composed essentially of polytrifluorochloroethylene. It should be understood, however, that fillers and plastic compositions other than the polymers of the present invention which do not materially affect the characteristics of polytrifluorochloroethylene may also be incorporated in the plastic material treated, and that the treatment of such compositions is also within the scope of this invention. In this respect, it has also been found desirable to incorporate plasticizing agents with the polytrifluorochloroethylene plastic to be molded, employing such plasticizers as polytrifluorochloroethylene itself but in an oily or waxy state. When incorporating such plasticizing agents with the polytrifluorochloroethylene plastic to be molded, it is possible to employ the lower temperatures within the aforementioned ranges for a given N. S. T. value of polytrifluorochloroethylene. From an economic standpoint, it is generally preferred to conduct the molding operation at as low a temperature as possible.

The actual fabrication of the improved insulating composition or gasket may be carried out in accordance with any one of several modifications of the process of the invention, as hereinafter described. Each of these modifications entails the step or steps of first preforming the core of the gasket comprising a solid polymer of tetrafluoroethylene, or a solid polymer of tetrafluoroethylene containing other strength-imparting materials, such as those previously described.

Such formation of the core may be obtained by placing powdered or granular tetrafluoroethylene within the cavity of a die and pressing this powdered material at sufficient pressure to form a closely adhering core of tetrafluoroethylene particles of sufficient structural strength to enable the preformed core to be handled without breakage. For this purpose, pressures, preferably not lower than 2,000 pounds per square inch are employed, although pressures as high as about 20,000 pounds per square inch may also be utilized. The compressed core is then subjected to a sintering operation to consolidate the tetrafluoroethylene particles, preferably employing temperatures between the softening temperature of tetrafluoroethylene and the temperature of decomposition, e. g. between about 700° F. and 800° F.

The finished sintered preformed tetrafluoroethylene core material, having the contour of the desired gasket, is then removed from the sintering chamber and is ready for further treatment in which the sheath of the trifluorochloroethylene polymer is applied thereon.

Another method of forming the desired core, may comprise forming extruded rods of the tetrafluoroethylene core material by conventional extrusion techniques, and subsequently employing these extruded rods, in the operation hereinafter disclosed, for forming the desired gasket covered with a sheath comprising a solid polymer of trifluorochloroethylene.

In connection with the aforementioned fabrication of the tetrafluoroethylene core of the improved gasket of the present invention, it has been pointed out that other inorganic filler materials, such as asbestos, powdered minerals, etc. imparting strength or resilience to the desired gasket article, may be incorporated in the tetrafluoroethylene core. In such instances, the core of the improved gasket article may comprise tetrafluoroethylene in an amount between about 50% and about 95% by weight. A preferred tetrafluoroethylene core comprises tetrafluoroethylene in an amount of approximately 50% by weight with the remaining 50% made up of any of the aforementioned filler materials, such as asbestos, etc., as previously described.

As indicated above, the tetrafluoroethylene core material is next fabricated so that it is encased or covered with a relatively thin contiguous sheath of a solid polymer of trifluorochloroethylene. According to one modification of the present process, previously extruded rods of the tetrafluoroethylene core material, preferably having incorporated therein a suitable filler matreial (as previously indicated), is subjected to conventional extrusion molding procedures, employing conventional extrusion apparatus such as is illustrated in Figure 1–6 on page 17 of "An Introduction to Engineering Plastics" by D. W. Brown and W. T. Harris (Murray Hill Books, Inc., New York 1947). In this modification, solid polytrifluorochloroethylene plastic is deposited in the form of a sheath or casing about the core material by extrusion, as the core material is passed through the chamber of the extrusion machine, heated, and then drawn through the die land, in the first step of the molding operation. The temperature maintained within the chamber is within the aforementioned range, namely, between about 415° F. and about 625° F., with the pressure being maintained between about 500 and about 25,000 pounds per square inch. The optimum operating conditions of temperature and pressure are selected within these ranges in accordance with the particular N. S. T. value of the trifluorochloroethylene plastic employed, as hereinbefore described. The hot extruded material emerging from the die land, comprising a relatively large resilient solid core comprising polymeric tetrafluoroethylene covered with a relatively thin sheath comprising a solid polymer of trifluorochloroethylene, is then allowed to cool; or is preferably quenched or rapidly cooled to a temperature below about 300° F. in air or in a water-bath. This covered article is next fashioned or shaped into the desired gasket form, e. g. in the shape of a circular gasket or O ring, by joining the ends of the thus-formed composition with a suitable cementing or binding agent, which in itself may contain a solid polymer of trifluorochloroethylene.

According to another modification of the present process, the aforementioned extruded rod of the core material comprising polymeric tetrafluoroethylene (and of similar composition as described in the aforementioned modification) is first dusted with a powdered polymer of trifluorochloroethylene, so that the entire rod is covered with polymer. The dusted rod is then placed within a suitable die mold, having the shape of the desired gasket article, and is then molded according to conventional compression molding techniques within the aforementioned ranges of temperature and pressure conditions. As in the above modification, the gasket composition thus formed, and covered with a relatively thin sheath of the trifluorochloroethylene polymer, is then removed from the die and allowed to cool, or subjected to positive cooling, to a temperature below about 300° F. The article thus obtained comprises, the desired gasket, in the desired shape. The ends of the thus-formed composition may be joined with a suitable cementing or binding agent, which itself may contain a solid polymer of trifluorochloroethylene.

In still another, and preferred, modification of the present invention, both the tetrafluoroethylene core material and the polytrifluorochloroethylene sheath are each separately preformed. The core material is preformed as in the modifications indicated above, with or without the presence of a suitable filler. The trifluorochloroethylene plastic sheath is preformed by fabricating two, one-half O rings, which are employed as shells for encasing the preformed core material. The term "one-half an O ring" is intended to denote a circular ring of trifluorochloroethylene plastic, split through the center plane to form one-half of the encasing shell.

These one-half O rings are preformed by placing a previously weighed-out quantity of powdered or granular polytrifluorochloroethylene plastic (depending upon the desired thickness of the shell) within a circular die cavity and molded according to conventional compression molding techniques, within the aforementioned ranges of temperature and pressure conditions. The thus formed one-half O ring, or half-shell, is next withdrawn from the die cavity and cooled, as indicated above. The aforementioned preformed rod comprising polymeric tetrafluoroethylene core material is next superimposed upon the surface of a one-half O ring, which is preferably grooved so that the rod of core material may be snugly inserted therein prior to heat-sealing by subsequent molding. Another one-half O ring is now superimposed upon the above-mentioned one-half O ring containing the core material. The core material, now encased within two, one-half O ring or gasket article, according to conventional molding techniques, but under the conditions of temperature and pressure, as hereinbefore indicated. The heat-sealed, completely encased core material, comprising the desired finished gasket of the present invention is then removed from the die and cooled.

Figure 2:
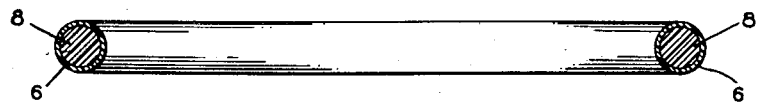
Figure 3:
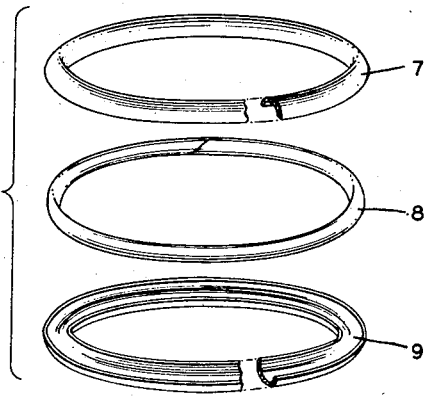

The structure of the improved insulating composition or gasket of the present invention, in the aforementioned preferred embodiment of an O ring, is shown in Figures 1, 2 and 3 of the accompanying drawing.

Figure 1 is a plan view of the improved gasket or O ring of the present invention.

Figure 2 is a detailed cross-sectional view of the improved gasket, taken along the line 2—2 of Figure 1. In Figure 2 is shown the resilient solid polymeric tetrafluoroethylene core material 8 of the gasket, covered with a relatively thin contiguous sheath or shell 6 comprising a solid polymer of trifluorochloroethylene.

Figure 3 is an exploded perspective view of the structural components of the improved gasket of O rings or shells 7 and 9, comprising polytrifluorochloroethylene plastic and the aforementioned polymeric tetrafluoroethylene core material 8, having a slightly smaller diameter than the outside periphery of the one-half O rings 7 and 9, but of such diameter as to fit snugly within the grooves of the one-half O ring shells.

While a particular embodiment of the present invention has been described for the purpose of illustration, it should be understood that various modifications and adaptations thereof which will be obvious to one skilled in the art may be made without departing from the spirit of the invention.

Having thus described my invention, I claim:

1. A method for forming a gasket comprising: forming a relatively large core comprising a solid polymer of tetrafluoroethylene; covering said core with a relatively thin sheath comprising a solid polymer of trifluorochloroethylene; heating the resulting article in a die maintained at a temperature between 415° F. and about 625° F. and under compacting pressure between about 500 and about 25,000 pounds per square inch for a time sufficient to permit said sheath to be brought into contiguity with and to assume the external contour of said core; and removing the gasket thus formed from said die.

2. A method for forming a gasket comprising: forming a relatively large core comprising a solid polymer of tetrafluoroethylene; covering said core with a relatively thin sheath comprising a solid polymer of trifluorochloroethylene; heating the resulting article in a die maintained at a temperature between about 445° F. and about 590° F. and under compacting pressure between about 700 and about 1400 pounds per square inch for a time sufficient to permit said sheath to be brought into contiguity with and to assume the external contour of said core; and removing the gasket thus formed from said die.

3. A method for forming a gasket comprising: forming a relatively large core comprising a solid polymer of tetrafluoroethylene; covering said core with a relatively thin sheath comprising a solid polymer of trifluorochloroethylene having an N. S. T. value between about 220° C. and about 350° C.; heating the resulting article in a die maintained at a temperature between about 415° F. and about 625° F. and under compacting pressure between about 500 and about 25,000 pounds per square inch for a time sufficient to permit said sheath to be brought into contiguity with and to assume the external contour of said core; and removing the gasket thus formed from said die.

4. A method for forming a gasket comprising: forming a relatively large core comprising a solid polymer of tetrafluoroethylene; covering said core with a relatively thin sheath comprising a solid polymer of trifluorochloroethylene having an N. S. T. value between about 240° C. and about 300° C.; heating the resulting article in a die maintained at a temperature between about 445° F. and about 590° F. and under compacting pressure between about 700 and about 1400 pounds per square inch for a time sufficient to permit said sheath to be brought into contiguity with and to assume the external contour of said core; and removing the gasket thus formed from said die.

5. A method for forming a gasket comprising: forming a relatively large core comprising a solid polymer of tetrafluoroethylene and an inorganic filler; covering said core with a relatively thin sheath comprising a solid polymer of trifluorochloroethylene having an N. S. T. value between about 240° C. and about 300° C.; heating the resulting article in a die maintained at a temperature between about 445° F. and about 590° F. and under compacting pressure between about 700 pounds per square inch and about 1400 pounds per square inch for a time sufficient to permit said sheath to be brought into contiguity with and to assume the external contour of said core; and removing the gasket thus formed from said die.

6. A method for forming a gasket comprising: forming a relatively large core comprising a solid polymer of tetrafluoroethylene and an inorganic filler, said polymer of tetrafluoroethylene being present in an amount between about 50% and about 95% of the weight of said core; covering said core with a relatively thin sheath comprising a solid polymer of trifluorochloroethylene having an N. S. T. value between about 240° C. and about 300° C.; heating the resulting article in a die maintained at a temperature between about 445° F. and about 590° F. and under compacting pressure between about 700 pounds per square inch and about 1400 pounds per square inch for a time sufficient to permit said sheath to be brought into contiguity with and to assume the external contour of said core; and removing the gasket thus formed from said die.

7. The gasket produced by the method of claim 1.
8. The gasket produced by the method of claim 2.
9. The gasket produced by the method of claim 3.
10. The gasket produced by the method of claim 4.
11. The gasket produced by the method of claim 5.
12. The gasket produced by the method of claim 6.
13. The method of claim 6, wherein said inorganic filler comprises asbestos.
14. The method of claim 6, wherein said inorganic filler comprises a powdered mineral.
15. The method of claim 6, wherein said inorganic filler comprises talc.
16. The method of claim 6, wherein said inorganic filler comprises mica.
17. The method of claim 6, wherein said inorganic filler comprises soapstone.
18. The method of claim 6, wherein said inorganic filler comprises a diatomaceous earth.

References Cited in the file of this patent

UNITED STATES PATENTS

| | | |
|---|---|---|
| 2,459,721 | Poltorak | Jan. 18, 1949 |
| 2,533,501 | Pendleton et al. | Dec. 12, 1950 |
| 2,538,808 | Swiss | Jan. 23, 1951 |
| 2,597,976 | Cousins | May 27, 1952 |
| 2,661,182 | Kipp | Dec. 1, 1953 |
| 2,717,024 | Jelinek | Sept. 6, 1955 |

OTHER REFERENCES

"The Chemical Age," July 13, 1946, page 44.
"Modern Plastics," June 1946, pages 134–135.
"Industrial and Engineering Chemistry," March 1947, vol. 39, pages 333–337.
"Product Engineering," May 1950, pages 130–134.
"Modern Plastics," Oct. 1948, pages 168, 170, 172.